(No Model.)
J. A. SEELY.
ELECTRIC CONNECTOR.
No. 419,365.   Patented Jan. 14, 1890.
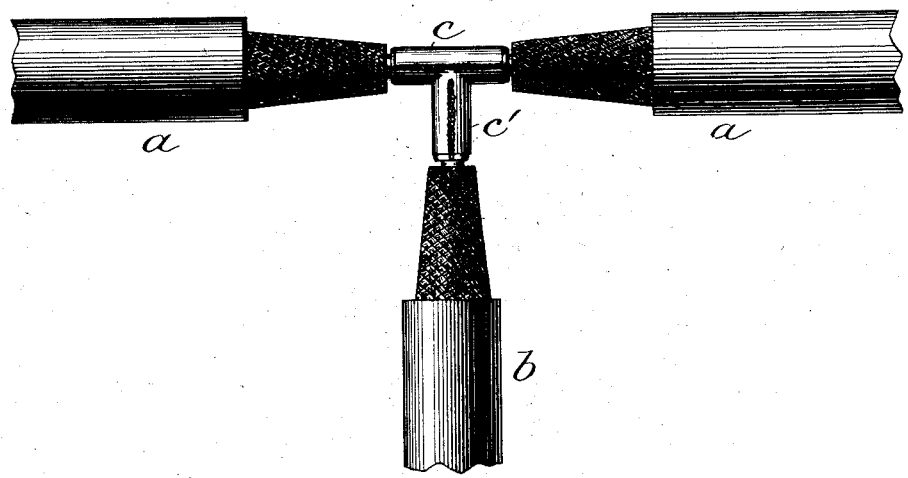
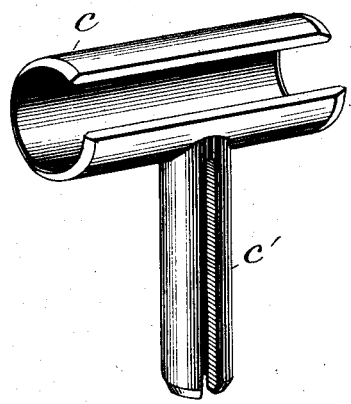
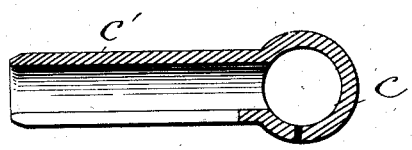
WITNESSES:
INVENTOR
John A. Seely
BY
ATTORNEY.

UNITED STATES PATENT OFFICE.

JOHN A. SEELY, OF BROOKLYN, NEW YORK.

ELECTRIC CONNECTOR.

SPECIFICATION forming part of Letters Patent No. 419,365, dated January 14, 1890.

Application filed October 30, 1889. Serial No. 328,697. (No model.)

*To all whom it may concern:*

Be it known that I, JOHN A. SEELY, a citizen of the United States, residing in Brooklyn, in the county of Kings and State of New York, have invented certain new and useful Improvements in Connections for Electric Wires, of which the following is a specification.

My invention relates to connections or joints for electric conductors.

The object of the invention, primarily, is to provide a joint in which the electric contact is good, and, further, the production of a joint which may be easily applied, and which will not chafe and eventually cut through the insulation of the conductors.

The invention is applicable, principally, to lead-covered cables, which are usually laid in conduits through the streets, the joints being made at intervals where lateral branches are run off to buildings.

My improved joint has the general form of a T; but its parts are open or slit to facilitate the connection with the wires. The wires when once adjusted are sealed in by solder, which flows into the slits of the joint and forms a solid connection and good electrical contact. The ends of the joint which abut against the fibrous insulation of the conductors are double beveled and rounded to prevent abrasion of the insulation. This obviates a fault in the ordinary T-couplings, which are usually made rough, and it has been found that the square ends are sometimes armed with a burr, which cuts through the insulation, thus admitting water and causing a "ground" or a short circuit.

In the accompanying drawings, Figure 1 represents an elevation of the joint in position, but without its final insulating-covering. Fig. 2 represents a perspective view of the joint detached, and Fig. 3 a section taken longitudinally through the stem of the joint.

In the figures, *a* represents a main cable, and *b* a branch connected therewith by the joint *c c'*. This joint is made of a single casting or of two sections of tubing or of a solid casting, and the material is of flexible metal. That portion *c* which incloses the main is slit longitudinally to admit the conductor, and the portion which surrounds the branch is also slit through a portion of its length.

As an article of manufacture these joints are constructed as shown in Fig. 2—that is, with the slits open to admit the two wires. The three ends of the joint are shown beveled.

The operation of making a connection is as follows: A section of the lead sheathing is removed from the main. The fibrous insulation is then cut away or tapered toward the middle of the opening, and finally enough of it is entirely removed to expose the length of conductor which is to be covered by the joint. The joint is then passed under the wire and brought up until it surrounds the same, when, by the use of a pair of pliers, the tube is bent up and around the conductor until the edges of the slit nearly meet. The branch *b*, the end of which has been exposed, is then pushed into the lateral stem of the joint and the pliers again used, if necessary, to bring up the sides of the tube against the wire. The joint having been placed in position, solder is poured into the slits, which flows around the conductor and makes good contact between the parts, besides sealing the joints. This done, the joint is wrapped or otherwise covered with insulation. The rounded edges prevent any abrasion of the insulating material.

It will be understood that the beveled edges and the splitting of the tubes will apply as well to ordinary straight couplings as to T or angle couplings.

Having thus described my invention, I claim—

1. A joint for electric wires, consisting of two tubes connected together and placed at an angle to each other, said tubes being slit longitudinally, as described.

2. A joint for electric wires, consisting of two tubes connected together and placed at right angles to each other, said tubes being slit longitudinally and made of flexible conducting material.

3. The combination, with the ends of an insulated electrical conductor, of a metallic coupling-sleeve joining said ends together, the ends of said sleeve being beveled to remove sharp edges, and insulating material covering said sleeve, substantially as described.

4. The combination, with a main electrical conductor and a branch therefrom, both being insulated, of a connector consisting of a metallic body surrounding and in connection with the main and the branch, the ends of the connector being beveled to remove sharp edges and the connector and surrounding parts covered with insulating material, all for the purpose set forth.

5. A coupling or joint for electrical conductors, consisting of a tube or sleeve, in combination with a conductor, the tube being provided with a longitudinal slit, and solder filling in the slit and connecting the walls of the two with the conductor.

In witness whereof I have hereunto signed my name in the presence of two subscribing witnesses.

JOHN A. SEELY.

Witnesses:
WM. A. ROSENBAUM,
THOMAS K. TRENCHARD.